June 21, 1960

A. ALPARD 2,941,769

HOLDER FOR CARRYING LONG HANDLED
IMPLEMENTS ON SHOPPING CARTS

Filed Oct. 21, 1957

INVENTOR.
AARON ALPARD
BY
*Sidney Levy*

AGENT

United States Patent Office 2,941,769
Patented June 21, 1960

2,941,769

HOLDER FOR CARRYING LONG HANDLED IMPLEMENTS ON SHOPPING CARTS

Aaron Alpard, Wharton, Tex.; Nellie Alpard, executrix of Aaron Alpard, deceased

Filed Oct. 21, 1957, Ser. No. 691,500

1 Claim. (Cl. 248—111)

This invention relates to implement holders, and, more particularly, to implement holders suitable for attachment to a shopping cart or the like.

One of the problems that shoppers frequently are faced with in the self service establishments is carrying long handled implements such as mops, brooms, or brushes to the check out area and, at the same time, managing a shopping cart. A frequent occurrence that results from the awkward handling of the implement is the disturbance of merchandise on shelves with a resulting accident which may embarrass the customer. A more serious possibility is that the end of the implement handle may injure another patron of the establishment. After one such experience the customer may be loathe to purchase items of this type in a self service store with a consequent loss of business.

It is an object of this invention to provide a convenient holder for carrying long handled implements suitable for attachment to a shopping cart or the like.

It is a further object of this invention to provide a holder which is readily attached to the shopping cart, or the like, with a minimum of tools and requiring a minimum of skill so that the store personnel can attach the holder to the cart with a minimum of difficulty.

It is a still further object of this invention to provide a holder which is readily and economically manufactured so that the widest possible use will be made of the invention.

Other objects will appear during the following description.

The construction and operation will be made clear by reference to the drawings.

Figure 2 shows how the invention is used in relation with a shopping cart or the like.

Figure 1:
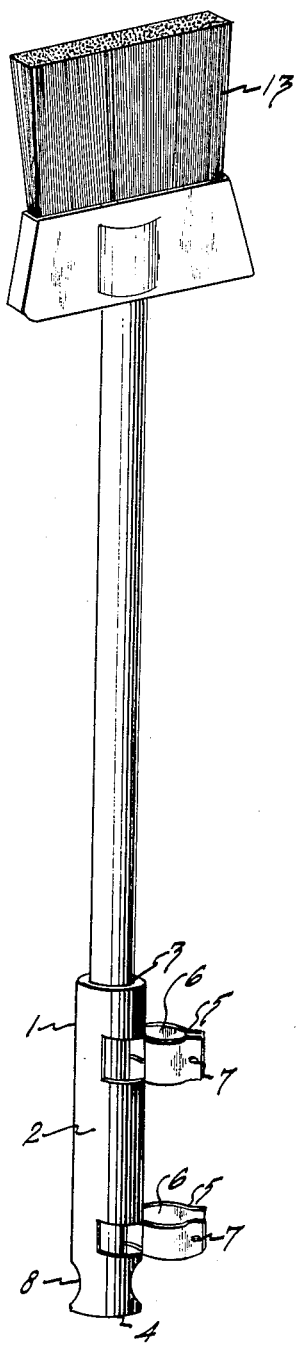
Figure 1 shows one preferred embodiment of the invention.

In Figure 1 the holder 1 comprises a hollow tubular member 2 with one open end 3 and one end which has been constricted 4. Formed out of portions of the wall of the tubular member 2 and disposed between the ends of the tube are clamping means 5. These clamping means 5 are shaped to conform to the member to which they are attached in the portion at 6 and are drilled near the end to form a hole adapted to receive a screw and nut 7 for the purpose of securing the holder to the cart. The constriction 8 provides a bottom for the holder.

Figure 2:
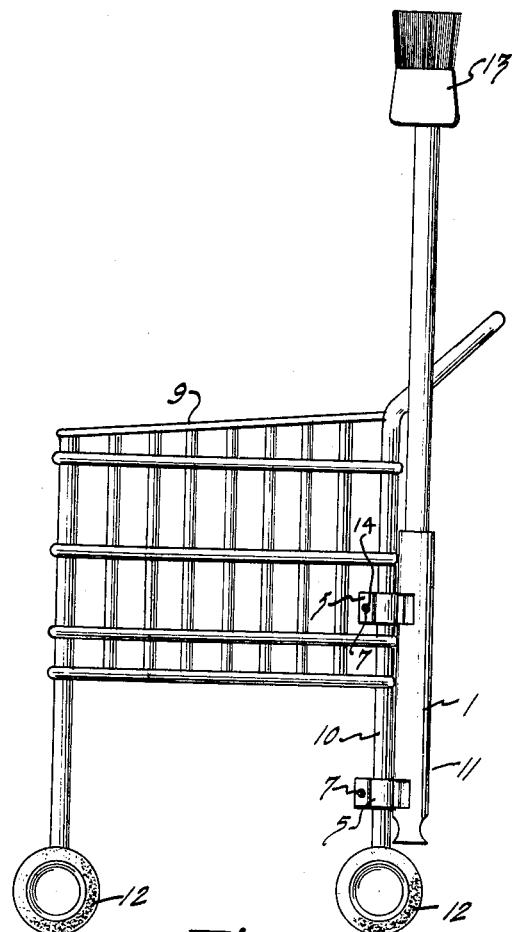

In Figure 2 the holder 1 is shown attached to a typical shopping cart 9 at one of the rear upright members 10. The holder 1 is secured to the upright member 10 by tightening the screw and nut 7 and closing the clamping means 5 tightly around the upright member 10 at a position between the basket portion 11 and the caster portion 12. A broom 13 is shown held in the holder 1 in the position in which it is held in use. It is apparent that the long handled implement can be conveniently carried out of harms way.

The design of the holder is such that it can be conveniently and inexpensively manufactured. In the form depicted the entire holder can be fabricated by simple power press operations out of a single piece of tubing. Alternatively the holder can be fabricated from a single piece flat metal blank. The clamping members 5 can be formed from the wall of the tube or from a section of the flat blank by shearing the wall and forming the sheared section. The flat blank can be formed into a tubular section by means of a suitable press die. The constriction 8 is formed in the wall of the tubular member 2 by still another power press operation and the screw holes in the clamping member at 7 can also be punched through as an alternative to drilling as mentioned hereinbefore.

Since the clamping means 5 and the constriction 8 are integral portions of the tubular member 2 the construction is strong and rigid. Furthermore since the clamping means 5 and the contriction 8 forming the bottom of the holder are made by inexpensive power press operations the resulting holder can be inexpensively manufactured.

It is apparent that the simple and sturdy one piece construction can also be adapted to manufacture by other means. For example with minor modifications the holder is readily adapted to be manufactured by molding from a tough, strong plastic material; a process which may be as economical as the manufacturing method described above.

The means employed to close the clamping means to secure the holder to the upright on the shopping cart or the like is a simple screw and nut which can be handled by anyone possessing a minimum of mechanical skill aided by a screwdriver and a pair of pliers. To provide an even simpler means that avoids the requirement for the tools a thumb screw may be substituted for the standard screw and a captive nut for the standard nut so that the clamping means can be closed with the use of just the fingers.

It is apparent that, when required, several holders may be attached to a shopping cart for use in an establishment that would sell a large number of long handled implements. It is also evident that the holder may have other uses to which it may be suited by virtue of its convenient shape.

While certain specific embodiments of the invention are shown and described herein, and certain specific uses suggested hereinbefore, variations may be made without departing from the spirit and scope of the invention as described hereinbefore. The invention is not limited except as set forth in the appended claim.

I claim:

A holder for removably supporting a long handle implement adapted to be attached to a cart of the type used for shopping comprising a tubular member adapted to removably receive the handle of said implement, said tubular member being of lesser length than the length of the implement handle and having an open mouth end and constricted bottom end adapted to limit the passage of said handle and to support it in position within said tubular member, said constriction comprising an inwardly directed indentation of the material from which the tubular member is formed sufficiently reducing the internal diameter thereof to prevent the passage of said handle and to maintain it in supported position, means for securing said tubular member in vertical disposition along a correspondingly vertically disposed element of said shopping cart, said means comprising spaced-apart clamps extending from said tubular member and disposed adjacent the end portions thereof, said clamps being formed integrally with the wall of said tubular member and comprising portions thereof partially severed therefrom and deformed to conform generally to the cross-section of the element of the shopping cart to which said holder is attached, said clamps comprising strap-like members for encompassing the element of said shopping cart and means for drawing said free ends to each other to thereby bring sail clamps into frictional holding engagement with the supporting element of said cart.

References Cited in the file of this patent

UNITED STATES PATENTS

| | | |
|---|---|---|
| 488,549 | Dugan | Dec. 27, 1892 |
| 2,191,782 | Valane | Feb. 27, 1940 |
| 2,441,734 | Van Hyning | May 18, 1948 |
| 2,494,350 | Mittermaier | Jan. 10, 1950 |
| 2,738,077 | Ingvertsen | Mar. 13, 1956 |

FOREIGN PATENTS

| | | |
|---|---|---|
| 18,021 | Great Britain | Sept. 6, 1905 |